(12) United States Patent
Fujimoto

(10) Patent No.: US 12,042,909 B2
(45) Date of Patent: Jul. 23, 2024

(54) ELECTRIC POWER TOOLS

(71) Applicants: TONE CO., LTD., Osaka (JP); SUBARU CORPORATION, Tokyo (JP)

(72) Inventor: Katsuhiro Fujimoto, Osaka (JP)

(73) Assignees: TONE CO., LTD., Osaka (JP); SUBARU CORPORATION, Tokyo (JP)

( * ) Notice: Subject to any disclaimer, the term of this patent is extended or adjusted under 35 U.S.C. 154(b) by 568 days.

(21) Appl. No.: 17/283,408

(22) PCT Filed: Oct. 25, 2019

(86) PCT No.: PCT/JP2019/041847
§ 371 (c)(1),
(2) Date: Apr. 7, 2021

(87) PCT Pub. No.: WO2020/085472
PCT Pub. Date: Apr. 30, 2020

(65) Prior Publication Data
US 2021/0379741 A1 Dec. 9, 2021

(30) Foreign Application Priority Data

Oct. 25, 2018 (JP) ................................. 2018-200697

(51) Int. Cl.
*B25B 23/14* (2006.01)
*B25B 21/00* (2006.01)
*H04W 4/80* (2018.01)

(52) U.S. Cl.
CPC .............. *B25B 23/14* (2013.01); *B25B 21/00* (2013.01); *H04W 4/80* (2018.02)

(58) Field of Classification Search
CPC .... B25F 5/00; B25F 5/003; B25F 5/02; B25F 5/025; B25B 21/00; B25B 23/00;
(Continued)

(56) References Cited

U.S. PATENT DOCUMENTS

2010/0265097 A1* 10/2010 Obatake .................... B25F 5/00
340/870.4
2016/0375563 A1* 12/2016 Junkers .................. B25F 5/026
81/467

(Continued)

FOREIGN PATENT DOCUMENTS

DE  10 2013 208 225 A1   11/2014
IT      UA20164314 A1   12/2017
(Continued)

OTHER PUBLICATIONS

European Patent Office "Patent Translate" English machine translation from Espacenet for DE 102013208225A1, 9 pp., Apr. 7, 2022.
(Continued)

*Primary Examiner* — Robert J Scruggs
(74) *Attorney, Agent, or Firm* — Eckert Seamans Cherin & Mellot, LLC

(57) ABSTRACT

The present invention provides an electric power tool comprising a rotary member including a rotating shaft, a fixed member including a motor for operating the rotary member, a data transmitting unit having a sensor to measure the physical quantity of the rotary member and a transmitter to transmit signals about the measurement value wherein the transmitter is electrically connected to the sensor, and both the transmitter and the sensor are mounted on the rotary member and are integrally rotatable with the rotating shaft, and a data transmitting/receiving unit having a receiver mounted on the fixed member, so that the signals are transmitted and received through near field wireless communication via the transmitter and the receiver, and the signals are sent from an outputting device.

12 Claims, 1 Drawing Sheet

(58) Field of Classification Search
CPC ..... B25B 23/14; B25B 23/141; B25B 23/147; B25B 23/1427; B25B 23/078; H04W 4/80
See application file for complete search history.

(56) References Cited

U.S. PATENT DOCUMENTS

| | | | |
|---|---|---|---|
| 2016/0375570 A1* | 12/2016 | Boeck | G05B 19/4062 700/169 |
| 2017/0129090 A1 | 5/2017 | Yamamoto | |
| 2018/0096530 A1 | 4/2018 | Greenhalgh et al. | |

FOREIGN PATENT DOCUMENTS

| | | |
|---|---|---|
| JP | 2007-283455 A | 1/2007 |
| JP | 2010-247277 A | 11/2010 |
| JP | 2017-87359 A | 5/2017 |
| JP | 2018-122429 A | 8/2018 |

OTHER PUBLICATIONS

European Patent Office "Patent Translate" English machine translation from Espacenet for ITUA20164314A1, 16 pp., Nov. 7, 2022.
European Patent Office "Supplementary European Search Report", from corresponding European Patent Application No. 19877387.1, 8 pp., Jun. 24, 2022.
Japanese Patent Office "International Search Report" from Japanese priority application PCT/JP2019/041847, Jan. 21, 2020 (Jan. 21, 2020), 4 pp.

* cited by examiner

ELECTRIC POWER TOOLS

TECHNICAL FIELD

The present invention relates to power tools such as tightening machines for fastening bolts, nuts, etc. More specifically, the present invention relates to electric power tools that wirelessly communicate in the inside thereof various data such as torque applied to rotary members with rotating shafts, and then provide a wired output of the data to the outside.

BACKGROUND ART

Power tools such as tightening machines capable of tightening bolts, nuts, and other fastening members with a set torque value are known. For example, Patent Document 1 comprises a torque detector with a torque sensor mounted on the tightening machine's rotating shaft. The torque detector is equipped with a wireless transmitter/receiver unit that wirelessly transmits torque data to a controller located outside.

CITATION LIST

Patent Document

[Patent Document 1] Japanese Patent Publication No. 2010-247277

SUMMARY OF INVENTION

In the environment where power tools are used, e.g., at construction sites and workplaces, a wide variety of wireless transmitter/receiver devices are deployed, and a variety of radio waves used for other communication are flying around. When wirelessly transmitting torque data from the torque detector to the controller, the data was often subject to interference and disturbance from radio waves, resulting in poor communication. Also, depending on conditions of use, there may be a radio wave blocking object between the power tool and the controller, causing poor communication.

The purpose of the present invention is to provide power tools that can perform good data communication by combining wireless and wired communication systems, reducing interference and disturbance from radio waves.

Means To Solve The Problem

The present invention provides a power tool comprising:
a rotary member including a rotating shaft,
a fixed member housed in a casing and including a motor for operating the rotary member,
a data transmitting unit having a sensor mounted on the rotary member and integrally rotatable therewith, wherein the sensor is adapted to measure values of the physical quantity of the rotary member to create measurement values, and a transmitter electrically connected to the sensor and adapted to wirelessly transmit signals about the measurement values measured by the sensor,
a data transmitting/receiving unit having a receiver mounted on the fixed member and adapted to wirelessly receive signals about the measurement values from the data transmitting unit and an outputting device adapted to output signals about the measurement values obtained by the receiver through a wired line,
the transmitter having a transmission antenna adapted to transmit signals about the measurement values through near field wireless communication, and
the receiver having a reception antenna placed close to the transmission antenna and adapted to receive signals about the measurement values through near field wireless communication.

The physical quantity can be a torque acting on the rotating shaft or a rotating shaft angle of the rotating shaft.

The power tool is preferred to comprise a display for viewing the physical quantity computed based on the measurement values' signals. The display is connected through a wired line to the outputting device.

The power tool can be a tightening machine.

The tightening machine includes an inner shaft with a socket that can fit a fastening member and an outer shaft to hold a reaction-force receiver. The sensor is preferably mounted on the inner shaft.

With the electric power tool, the sensor mounted on the rotary member measures signals of the measurement values. The transmitter transmits the signals to the receiver mounted on the fixed member via wireless communication using near field wireless communication. The outputting device then outputs the signals through a wired line. As the near field wireless communication is less susceptible to interference and disturbance from radio waves in the external environment, the measurement values' signals can be transmitted and received reliably. Wireless transmission between the transmitter and the receiver eliminates the need for cable connections of the rotary member. The wireless communication also makes it unnecessary to take measures against cable breakage and unnecessary to provide mechanisms for controlling the rotary member's rotation. The outputting device disposed on the fixed member outputs the measurement values' signals through a wireline, whereby physical quantities such as the torque and/or the rotating shaft angle that were computed based on the measurement values' signals can be represented on display without being affected by the rotation of rotary member and the interference and disturbance from radio waves. Besides, the near field wireless communication provides additional advantages of reducing the battery consumption of the data transmitting/receiving unit, especially of the data transmitting unit.

DESCRIPTION OF EMBODIMENTS

Figure 1:
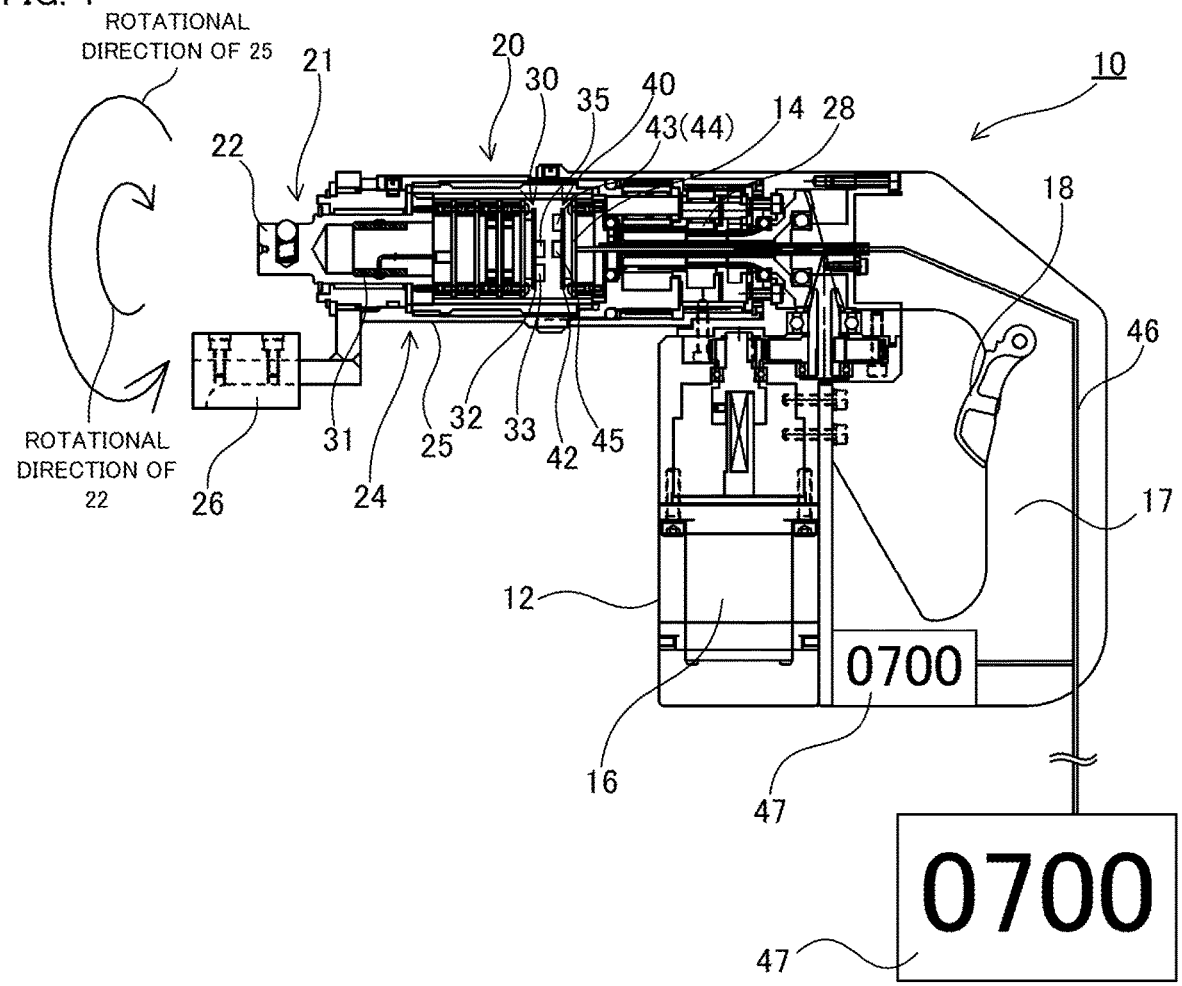
FIG. 1 shows an illustration of a power tool (tightening machine) according to one embodiment of the invention.

According to an embodiment of the present invention, an electric power tool will be described below for a tightening machine 10 as an example of the power tools, with reference to the drawings. The tightening machine 10 is an electric power tool adapted to tighten a fastening member such as bolts and nuts. In the embodiment shown in the figures, the tightening machine 10 comprises a casing 12, an internal unit 21 equipped with a socket (not shown) into which the fastening member is fittable, and an outer unit 24 provided with a reaction-force receiver 26, wherein the inner and outer units 21, 24 are arranged at forwarding end of the casing 12. The internal unit 21 has an inner shaft 22, and the outer unit 24 has an outer shaft 25. These shafts are connected to a reduction mechanism 28, such as a planetary gear mechanism to form a rotary member 20. As shown by the arrows in the figure, the inner and outer shafts 22, 25 rotate in opposite directions. The speed reduction mechanism 28 is connected to a motor 16.

The casing 12 includes a handle 17 provided with a trigger switch 18. The motor 16 is rotatable by operating the trigger switch 18 on the handle 17.

The tightening machine 10 is disposed on the rotary member 20 thereof with a sensor 31 for measuring the physical quantities of the rotary member 20. The sensor 31 can be changed on the physical quantities to be measured. Examples of the sensor 31 include, for example, a strain gauge for the torque, and an encoder, gyro sensor, photo interrupter, magnetic sensor, etc., for the rotating shaft angle.

The sensor 31 is preferably mounted on the inner shaft 22 of the internal unit 21 of the rotary member 20. This allows for more accurate measurement of the torque, rotating shaft angle, etc., because the inner shaft 22 is directly connected to the fastening member and the socket, compared to the embodiment wherein the sensor 31 is mounted on the outer unit 24.

Figure 2:
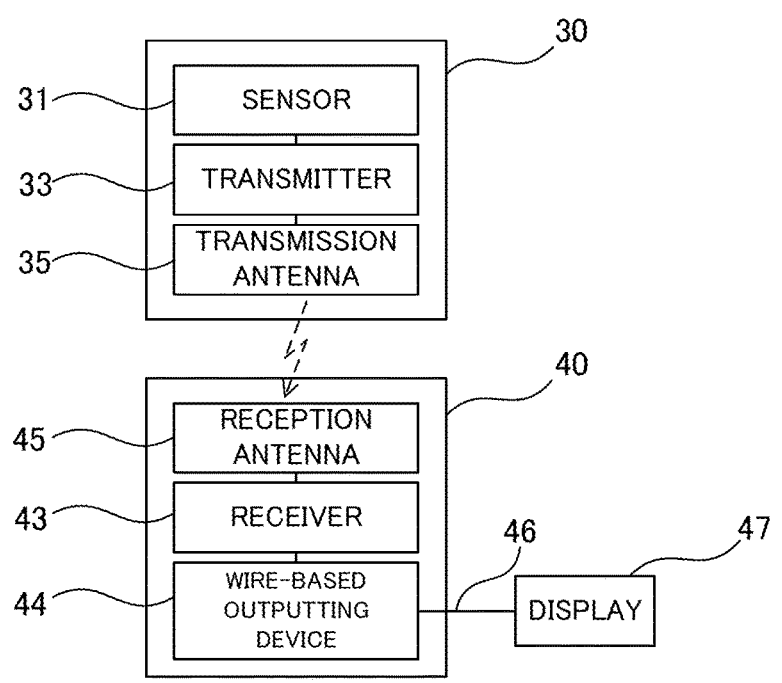
FIG. 2 shows a block diagram of the units used for transmitting and receiving signals about the measurement values.

As shown in FIG. 1 and partly in FIG. 2, the sensor 31 is electrically connected to a transmitter 33. The transmitter 33 includes an A/D converter, amplification circuit, CPU, etc., and RF (radio frequency) circuit on one or more substrate 32. The substrate 32 is provided on the rotary member 20 and is rotatable integrally therewith. A transmission antenna 35 is connected to the RF circuit on the substrate. The sensor 31 and the transmitter 33 with the transmission antenna 35 provide a data transmitting unit 30. The data transmitting unit 30 includes a battery such as a rechargeable battery and operates when power is supplied from the battery.

The transmitter 33 sends signals about the measurement values from the transmission antenna 35 via near field wireless communication such as Bluetooth (registered trademark). The near field wireless communication is not limited to Bluetooth but may be ZigBee (registered trademark), infrared communication, etc.

In the embodiment of FIG. 1, the transmission antenna 35 is disposed on the base end of the internal unit 21, and is preferably placed concentrically with the center of rotation of the internal unit 21 to transmit and receive signals at a position close to the data transmitting/receiving unit 40 described below.

The data transmitting/receiving unit 40 receives signals about the measurement values sent from the data transmitting unit 30. The data transmitting/receiving unit 40 comprises a receiver 43 and a wire-based outputting device 44, which are provided on a fixed member 14, such as the casing 12 of the tightening machine 10. The receiver 43 comprises a reception antenna 45, RF circuit, CPU, etc., and the wire-based outputting device 44 provides outputs of the measurement values' data the receiver 43 received wirelessly. When the tightening machine 10 is driven by a commercial power source, the receiver 43 may utilize such a commercial power source. When the tightening machine 10 is driven by a battery, the receiver 43 may use such a battery.

The reception antenna 45 is arranged close to a transmission antenna 35 to perform near field wireless communication efficiently. In the embodiment of FIG. 1, the reception antenna 45 is positioned opposite the transmission antenna 35.

The data transmitting/receiving unit 40 transmits signals about the measurement values the receiver 43 received via the reception antenna 45 to the wire-based outputting device 44. The wire-based outputting device is connected thereto a cable 46 through which the signals are output to a display 47 disposed at a suitable place in the tightening machine 10 or a display 47 disposed outside the tightening machine 10, as shown in FIG. 1. The signals about the measurement values as physical quantities can be shown on the display 47. In FIG. 1, the display 47 shows torque (700 (N/m)). The display 47 may be a PDA (Personal Digital Assistant) or the like. Items shown on the display include not only physical quantities but also information on the location and time of the tightening operation obtainable by superimposing the location information and time stamp from the GPS (Global Positioning System) function on the signals about the measurement values output from the data transmitting/receiving unit 40. These data may be graphed or recorded in a storage device.

The display 47 may also serve as a controller capable of inputting physical quantities such as the torque to tighten the fastening member. When arriving at the desired physical amount, the controller may control to shut off the power supplied to the motor 16. When approaching the desired physical quantity, the controller may control to reduce the power supplied to the motor and then decrease speed.

Thus, according to the tightening machine 10, the sensor 31 can be placed directly on the internal unit 21 of the rotary member 20. Since the torque acts directly on the internal unit 21, especially on the inner shaft 22, the sensor can measure the physical quantity more accurately.

The signals about the measurement values measured by the sensor 31 are wirelessly transmitted to the fixed member 14 side by near field wireless communication. Since near field wireless communication is not susceptible to interference or disturbance from radio waves in the external environment, the signals about measurement values can be transmitted and received reliably with minimal communication failure. Wireless transmission between the transmitter 33 and the receiver 43 eliminates the need for cable connections of the rotary member 20. This makes it unnecessary to take measures against cable breakage and also unnecessary to provide mechanisms for controlling the rotation of the rotary member 20.

Besides, the near field wireless communication provides the advantage of reducing the battery consumption of the data transmitting/receiving unit, especially of the data transmitting unit.

The signals about the measurement values obtained by near field wireless communication are output to the display 47 on the fixed member 14 side through a wireline so that the physical quantities such as torque and/or rotating shaft angle that were computed based on the measurement values' signals can be presented on the display 47 without being affected by the interference and disturbance from radio waves.

Therefore, according to the present invention, the power tool is useful at construction sites where there are many interfering radio waves, radio interference, and radio wave blocking objects.

The above description is for the purpose of explaining the invention, and should not be construed as limiting or restricting the scope of the invention as described in the claims. In addition, the configuration of each element of the invention is not limited to the above examples, and various variations can be made within the technical scope of the claims.

EXPLANATION OF THE REFERENCE NUMERALS

10 Electric power tool (tightening machine)
14 Fixed member

20 Rotary member
30 Data transmitting unit
31 Sensor
35 Transmitting antenna
40 Data transmitting/receiving unit
43 Receiver
44 Wire-based outputting device
45 Reception antenna
47 Display

The invention claimed is:

1. An electric power tool comprising:
a rotary member including a rotating shaft;
a fixed member housed in a casing and including a motor for operating the rotary member,
a data transmitting unit having a sensor that measures values of the physical quantity of the rotary member to create measurement values, and a transmitter that is electrically connected to the sensor and wirelessly transmits signals about the measurement values measured by the sensor,
wherein both the sensor and the transmitter are mounted on the rotary member and integrally rotatable with the rotary shaft,
a data transmitting/receiving unit having a receiver that is mounted on the fixed member and wirelessly receives signals about the measurement values from the data transmitting unit and an outputting device that outputs signals about the measurement values obtained by the receiver through a wired line,
the transmitter having a transmission antenna that transmits signals about the measurement values through near field wireless communication, and
the receiver having a reception antenna that receives signals about the measurement values through near field wireless communication,
wherein the transmission antenna is disposed concentrically with the center of rotation on a base end side of the rotary member, and the reception antenna is disposed on the fixed member at a position close to and opposite to the transmission antenna.

2. The electric power tools as defined in claim 1 wherein the physical quantity comprises a torque acting on a rotating shaft or a rotating shaft angle of the rotating shaft.

3. The electric power tools as defined in claim 2 wherein the electric power tool further comprises a display for viewing the physical quantity computed based on the signals about the measurement values, wherein the display is connected through a wired line to the outputting device.

4. The electric power tool as defined in claim 3 wherein the electric power tool comprises a tightening machine.

5. The electric power tool as defined in claim 4 wherein the tightening machine includes an inner shaft with a socket that can fit a fastening member and an outer shaft to hold a reaction-force receiver, and the sensor is mounted on the inner shaft.

6. The electric power tool as defined in claim 2 wherein the electric power tool comprises a tightening machine.

7. The electric power tool as defined in claim 6 wherein the tightening machine includes an inner shaft with a socket that can fit a fastening member and an outer shaft to hold a reaction-force receiver, and the sensor is mounted on the inner shaft.

8. The electric power tools as defined in claim 1 wherein the electric power tool further comprises a display for viewing the physical quantity computed based on the signals about the measurement values, wherein the display is connected through a wired line to the outputting device.

9. The electric power tool as defined in claim 8 wherein the electric power tool comprises a tightening machine.

10. The electric power tool as defined in claim 9 wherein the tightening machine includes an inner shaft with a socket that can fit a fastening member and an outer shaft to hold a reaction-force receiver, and the sensor is mounted on the inner shaft.

11. The electric power tool as defined in claim 1 wherein the electric power tool comprises a tightening machine.

12. The electric power tool as defined in claim 11 wherein the tightening machine includes an inner shaft with a socket that can fit a fastening member and an outer shaft to hold a reaction-force receiver, and the sensor is mounted on the inner shaft.

* * * * *